Oct. 30, 1956     A. D. BRUNDAGE     2,768,530
WINDSHIELD WIPER DRIVE AND PARKING CONTROL
Filed July 9, 1952     3 Sheets-Sheet 1

INVENTOR.
ALAN D. BRUNDAGE

BY
ATTORNEY

Oct. 30, 1956  A. D. BRUNDAGE  2,768,530
WINDSHIELD WIPER DRIVE AND PARKING CONTROL
Filed July 9, 1952  3 Sheets-Sheet 2
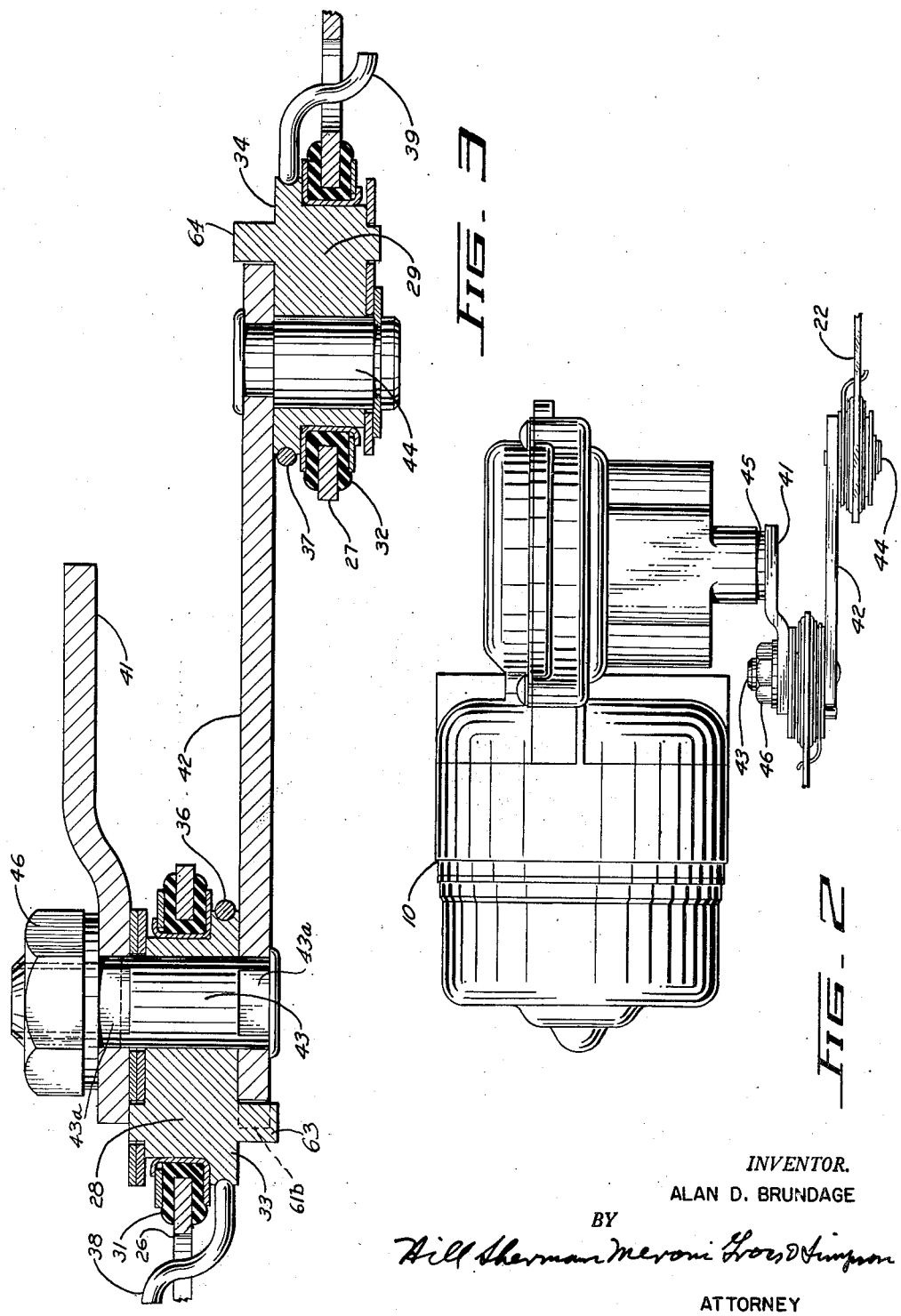
INVENTOR.
ALAN D. BRUNDAGE
BY
ATTORNEY

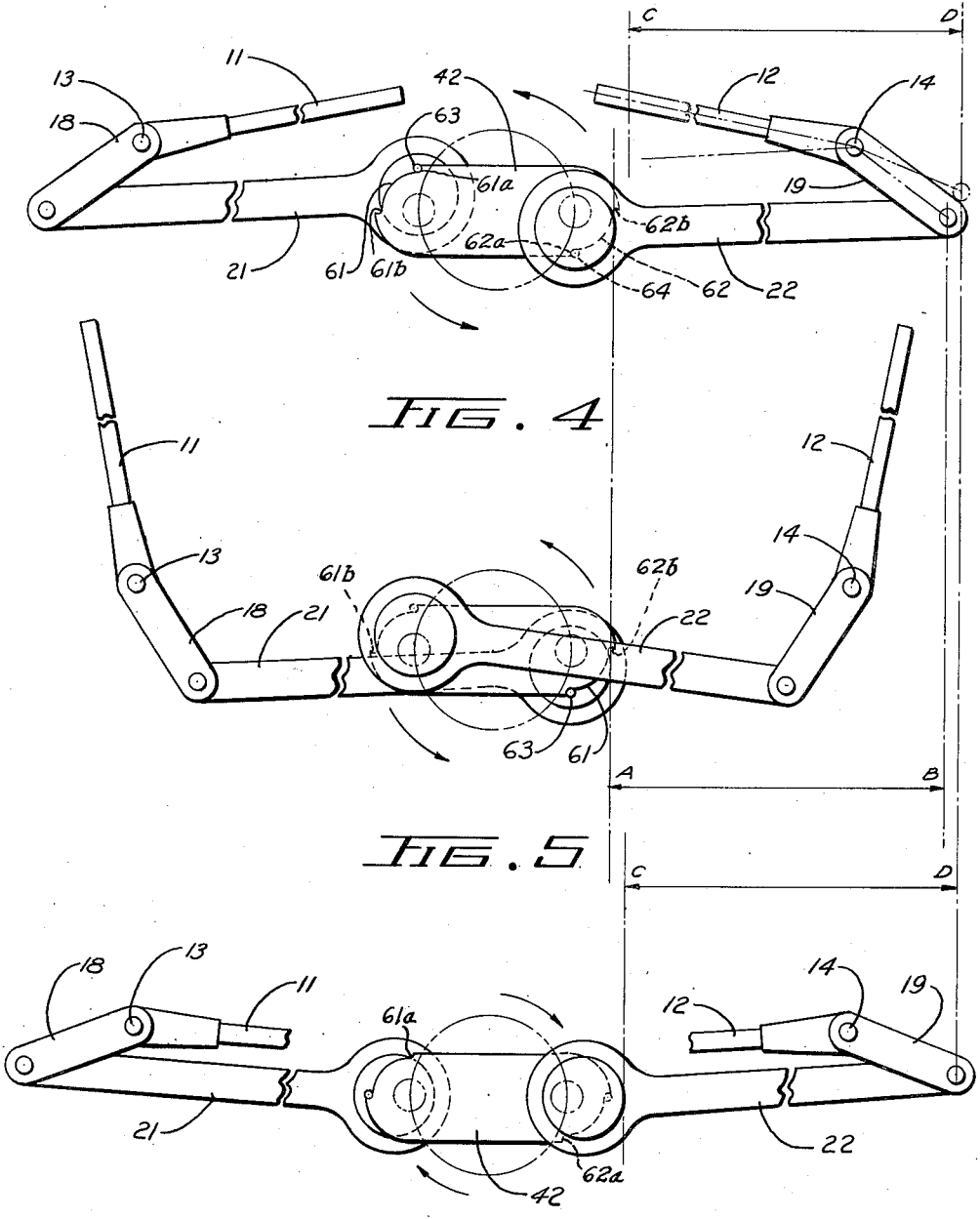

United States Patent Office 2,768,530
Patented Oct. 30, 1956

2,768,530

WINDSHIELD WIPER DRIVE AND PARKING CONTROL

Alan D. Brundage, Birmingham, Mich.

Application July 9, 1952, Serial No. 297,949

3 Claims. (Cl. 74—75)

This invention relates to windshield wiper apparatus for motor vehicles, and particularly to the control of the linkage by which the rotary motion of a driving motor is converted to oscillating motion at the wiper arms and blades.

In certain apparatus now in use, a driving motor, rotating continuously in a single direction, is fitted with a dual crank mechanism including a pair of spaced crank pins, or bearings, one of which receives one end of a link leading to one of a pair of wiper arms; the other crank pin receiving one end of a second, and similar, link leading to the companion wiper arm. As the two crank pins have fixed orbits, it follows that the paths described by the links and wiper arms are correspondingly fixed—that is, each wiper arm (and its attached wiper blade) swings through a path of fixed extent; the upper limit of the path being adjacent the side limit of the windshield glass, and the lower limit being just slightly above the bottom edge of the windshield glass.

The fact that the lower ("parked") position of the wiper arm and blade is slightly above the bottom edge of the glass, is a point of objection, in that during periods of non-use of the wipers it would be preferable to have them parked entirely beyond—that is, below the glass, so that vision through the glass of the windshield will be entirely unobstructed. It is readily possible to achieve such "depressed parking" in systems utilizing reciprocating piston, or vane, motors responding to fluid pressure differences, or vacuum; the result being brought about by extending the normal stroke of the motor.

On the other hand, with a driving motor of the rotary type having fixed crank throws, the task of changing the normal sweep range of the wiper arms, in order to secure "off-the-glass" or depressed parking of the wiper arms and blades, is one that does not lend itself to any quick or easy solution. I have, nevertheless, arrived at one solution and present it herewith.

An object of the invention, therefore, is to provide in a windshield wiper mechanism having oscillating wiper blades actuated by a single rotary motor, novel means for varying the range of sweep of the wiper blades at the conclusion of motion thereof, so as to achieve "off-the-glass" parking of said blades.

A second object of the invention is to produce, in a mechanism of the character indicated, novel motion translating connections between the driving motor and wiper linkage, said connections being adapted to maintain predetermined relationships so long as the driving motor rotates normally, and to shift their relationships upon termination of normal drive, preparatory to parking the wiper blades.

A third object is to provide a novel method of control of wiper blades actuated by a rotating motor, which novel method of control includes the steps of reversing the normal direction of rotation of the motor as a means of changing the normal range of sweep of the wiper blades, and thereby achieving "off-the-glass" parking.

These and other objects of the invention are more fully indicated in the following description of the embodiment of the invention illustrated in the accompanying drawings wherein:

Figure 2 is a plan view of the central portion of the apparatus of Figure 1 with the parts in "parked" position;

Figure 3 is a plan view, on a larger scale, of the crank assembly of Figure 2;

Figures 4 and 5 are diagrams showing the two extreme positions of link motion during the normal wiping cycle; and Figure 6 is a diagram showing the relationships of the parts at the termination of the final (reverse action) stroke.

Figure 1:
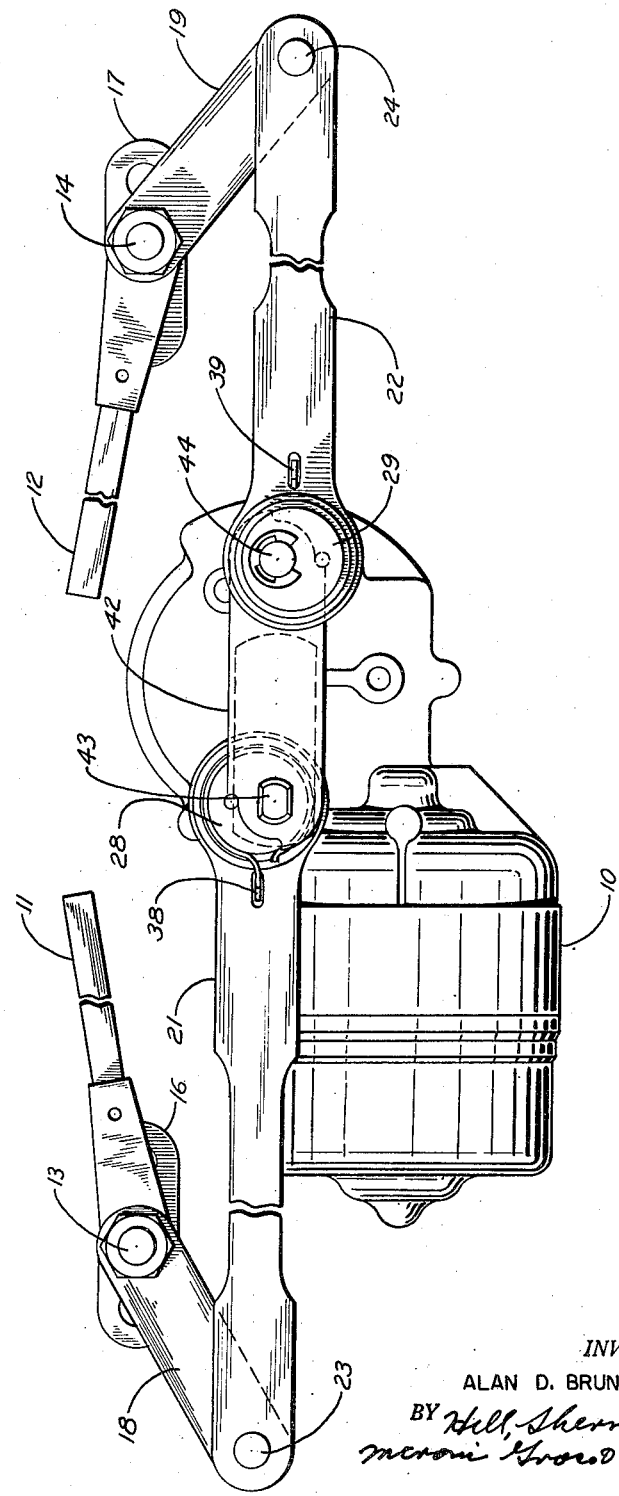
Figure 1 is an elevational view of a windshield wiper apparatus embodying the invention.

Referring first to Figure 1, the electric motor 10 mounted on the forward transverse structure of the vehicle, below the center point of the lower edge of the windshield frame is provided with a sectional housing. The right-hand section of the housing extends a considerable distance to the right to enclose a worm-shaft and a worm gear, the latter being integrated with a second shaft to whose outer end is secured the crank assembly serving as the means for converting the rotation of the motor driven worm shaft into rocking motion of the windshield wiper arms 11 and 12. Arms 11, 12 rock with the pivot shafts 13, 14 respectively journalled in the frame elements 16, 17 of the vehicle, and these pivot shafts 13, 14 are actuated by levers 18, 19 constituting the shorter links of the motion converting linkage whose longer links 21, 22 pivotally connect therewith, as indicated at 23, 24.

The inner ends of links 21 and 22 are enlarged and apertured to form rings 26, 27 which are rotatably mounted on the eccentric elements 28, 29, shown best in Figure 3. Rubber containing grommets 31, 32 are inserted in the rings 26, 27 prior to their mounting on the eccentrics 28, 29. The eccentrics have portions 33, 34 of larger diameter, these larger portions being grooved to receive metal spring type friction rings 36, 37 respectively, whose tails 38, 39 extend through secondary apertures of the links 21, 22 to resist to a slight degree rotations of the eccentrics in relation to their associated links and to dampen rattles and other vibrations.

As shown best in Figures 2 and 3, the crank assembly includes a pair of crank arms 41, 42 and a pair of crank pins or bearing pins, 43, 44; the crank arm 41 being the driving connection from the worm gear shaft to the pin 43, and the crank arm 42 being the driving connection from pin 43 to pin 44. As seen in Figure 3, the eccentric elements 28 and 29 are pivotally carried on the pins 43 and 44, respectively. Crank arm 41 is preferably integrated with a sleeve 45 (Figure 2) secured to the worm-gear shaft (not shown) while the remainder of the crank assembly is demountable readily by unscrewing the nut 46 on the threaded end of pin 43. Both pins 43, 44 have rivet type integration with crank arm 42. The pin 43 is fixedly secured to crank arms 41 and 42 by means of the flat surfaces 43a. In operation, therefore, the crank arm 42 rotates simultaneously with and about the same axis as crank arm 41.

Assuming the closing of the circuit to supply energizing current to motor 10 for the normal direction of rotation (as indicated by the arrows of Figures 4 and 5) the resulting rotation of the motor in this normal direction will cause the pins 43 and 44 to move in an arcuate path. Due to the resistance of the blades 11 and 12, the eccentrics 28 and 29, which are pivoted frictionally to pins 43 and 44, will pivot about the pins until the point of greatest radius is "trailing" the pin, or until some mechanism stops rotation of the eccentrics before such a position is reached. As will be discussed later, a stop is provided in the present construction which intercepts the eccentric before it quite reaches a fully trailing position (which would be such that the point of greatest radius lies on a line tangent to the arc traveled by the centerline of the pins 43 and 44). As soon as the eccentrics stop rotating about the pins 43 and 44, the links 21 and 22 are actuated in an oscillatory path in repeated cycles, between the two extreme positions shown in Figures 4 and 5; the Figure 4 position being the lowest position which the wiper arms 11, 12 can reach in normal cycling.

To enable the wiper arms 11, 12 to reach still lower positions at the conclusion of the final cycle, following the manual shifting of the control switch (not shown) to the "off" position, the present invention constructs the cooperating elements 42, 28 and 29 in such fashion as to cause the normal limit position of each of the links 21, 22 to be displaced laterally, from the "A—B" position (Figure 5) to the "C—D" position (Figure 6). As indicated best in Figures 4 to 6, the end portions of crank arm 42 are cut away on opposite sides of the longitudinal center line of the arm, thus forming an arcuate race-way or track of approximately ninety degree extent, at each end of the crank arm. These tracks 61, 62 have end stops 61a, 61b, 62a and 62b which engage the projections 63, 64 of the eccentrics 28, 29. In the normal rotation of the crank arm the projections 63, 64 are constrained to remain at the inboard ends of the tracks 61, 62, indicated at 61a and 62a, respectively, as a result of the forces tending to make the eccentrics trail the pins 43, 44. However, immediately upon manual movement of the motor circuit control switch (not shown) to the "off" position, there is established a reverse-rotation energizing circuit that is operative to reverse the direction of rotation of the crank arm, and continue such reverse rotation until the interruption of the circuit by operation of the periodically acting cam element which is conventionally included in the motor circuit. Upon such reverse rotation of the crank arm, the eccentrics, which are now "leading" the pins 43 and 44, pivot about the pins to reach a trailing position in the new direction of rotation. They are intercepted by the stops 61b and 62b, however, in a position wherein the point of greatest radius extends radially outwardly from the axis of rotation of the cranks 41 and 42. While the eccentrics are in these positions, it will be seen that the effective length of the crank arm 42 has been increased in each direction from the center thereof, which, in turn, increases the throws of the wiper arm drive means, including lengths 18 and 19, and 21 and 22, respectively. An increase in the throws of the wiper arm drive means causes an increase in the sweeps of the wiper arms 11 and 12 enabling wiper blades connected thereto to cover a larger area. Thereupon the links 21, 22 (and, with them, the arms 11, 12) resume harmonic motion; but before thus resuming harmonic motion, the eccentrics will have been shifted approximately ninety degrees from their normal relationships to the crank arm 42. This shift produces a corresponding shift in the positions of the links 21, 22—namely, from positions "A—B" to positions "C—D." The result is that links 21, 22 come to rest in positions "C—D"; and in these positions, as shown in Figure 6, the wiper arms are "depressed" below the horizontal plane of the pivots 13, 14, hence below the lower edge of the windshield glass. Thus, depending upon the rotation of the crank arm 42, the effective length thereof will be varied by the coaction of the projections 63 and 64 on the eccentrics 28 and 29 with the stops 61a and 61b, and 62a and 62b, respectively, on the crank arm 42.

From the above disclosure, it is apparent that I have invented a novel and extremely effective windshield wiper construction wherein the wiper arms are positioned completely off the glass when not in use.

It will be understood that modifications and variations may be effected without departing from the scope of the novel concepts of the present invention.

I claim as my invention:

1. A windshield wiper drive mechanism comprising a shaft mounted for rotation in either direction, a crank arm fixedly secured to said shaft, a pin on said crank arm, an eccentric pivotally mounted on said pin, link means rotatably mounted on said eccentric, connecting means between said link and a wiper arm, and means fixed relative to said crank arm for controlling the position of said eccentric to increase the effective length of said crank arm upon reverse rotation of said shaft, thereby enlarging the path of movement of said wiper arm.

2. In a windshield wiper mechanism, a rotating power shaft, first crank means connected to said shaft for rotation therewith, a first pin fixed to said crank, second crank means secured to said first pin for movement with said first crank, a second pin on said second crank, eccentric means pivotally mounted on each pin, a connecting rod rotatably carried by each eccentric means, a wiper arm pivotally mounted at one end and being operatively connected to each connecting rod, and means on each eccentric coacting with means on said second crank means for varying the effective length of said second crank means upon reverse rotation of said shaft.

3. A windshield wiper drive mechanism comprising a shaft mounted for forward and reverse rotation, a crank arm secured to said shaft, a crank pin on said crank arm, an eccentric pivotally mounted on said crank pin, wiper arm drive means rotatably connected to said eccentric, a projection on said eccentric and a pair of cooperating stop means fixedly secured to said crank arm for coaction with said projection, whereby the effective length of the crank arm is increased upon reversed rotation of said shaft, thereby enlarging the stroke of the wiper arm drive means.

References Cited in the file of this patent
UNITED STATES PATENTS

| 2,232,480 | Schmid | Feb. 18, 1941 |
| 2,308,212 | Scott-Iversen et al. | Jan. 12, 1943 |
| 2,491,697 | Vischulis, Jr. | Dec. 20, 1949 |
| 2,587,163 | Jackson | Feb. 26, 1952 |